United States Patent

[11] 3,575,638

[72] Inventor George L. Filip
 Madison, Ala.
[21] Appl. No. 835,059
[22] Filed June 20, 1969
[45] Patented Apr. 20, 1971
[73] Assignee The United States of America as represented by the Administrator of the National Aeronautics and Space Administration

[54] STORAGE CONTAINER FOR ELECTRONIC DEVICES
 6 Claims, 6 Drawing Figs.
[52] U.S. Cl. .................................................. 317/101, 339/17
[51] Int. Cl. .................................................. H05k 1/04
[50] Field of Search .......................................... 317/101 (CC), 101 (C), 101 (B); 324/158 (F); 206/65 (F); 174/138.5

[56] References Cited
 UNITED STATES PATENTS
3,011,379 12/1961 Corwin ......................... 324/158F(UX)
3,319,166 5/1967 Coleman ....................... 324/158F(UX)
3,354,394 11/1967 James ........................... 324/158F(UX)
3,377,514 4/1968 Ruehlemann et al. ........ 317/101CP(UX)
 OTHER REFERENCES
 Betz et al., "Monolithic Module Packaging Technique" I.B.M. Tech. Disc. Bull, Vol. 9, No. 11, Apr. 1967 (Copy 339-17, p. 1510

Primary Examiner—David Smith, Jr.
Attorneys—L. D. Wofford, Jr., C. C. Wells and G. T. McCoy ABSTRACT: A sealed storage container for channel carriers having miniature electronic components mounted thereon. The container includes a base and a cover, and the base has several groups of three closely spaced slots cut therein; each group of slots receiving a channel carrier. Each slot has a spring conductor mounted therein that includes an elongated member terminating at one end in a point and at the other end in a tab. The spring conductor has a post extending from about the middle thereof that passes through the base and is soldered to one of a number of printed circuit paths on the outside of the base. The printed circuit paths extend to one side of the base member to form a male plug portion that makes it possible to plug the storage container into an instrument and perform electrical tests on the component while the channel carrier is sealed in the storage container.

PATENTED APR 20 1971 3,575,638

INVENTOR
GEORGE L. FILIF
BY
ATTORNEYS

INVENTOR
GEORGE L. FILIP
BY
ATTORNEYS 3,575,638

STORAGE CONTAINER FOR ELECTRONIC DEVICES

ORIGIN OF THE INVENTION

The invention described herein was made by an employee of the U.S. Government and may be manufactured and used by or for the Government of the United States of America for governmental purposes without the payment of any royalties thereon or therefor.

BACKGROUND OF THE INVENTION

The invention relates to storage containers for miniature electronic components. More particularly it relates to such containers wherein provision is made for testing of the components while sealed within the storage container.

The use of miniature electronic circuits is expanding rapidly and one commonly used device in such circuits is a channel carrier. A channel carrier is a device on which one or more miniature electronic components, like a field effect transistor for example, are mounted. The channel carrier includes conductive surfaces which are connected by suitable leads to the terminals of the mounted components. When it is desired to use the mounted component in fabricating a circuit, the component is hooked into the circuit by connecting leads from the circuit to the conductive surfaces of the channel carrier.

It is desirable, and sometimes necessary to test the component prior to use or during storage periods and it is this testing that has caused a problem in the past. To test the component requires the welding of wires to the conductive surfaces of the channel carrier and gluing or otherwise attaching the channel carrier to a printed circuit board. The wires welded to the channel carrier are connected to conductive paths on the circuit board which in turn are connected to some electrical device used for testing the components.

This is not a desirable test procedure because it is time consuming and often the component being tested is damaged during handling or while setting up or tearing down the test hook up. The channel carrier is particularly susceptible to damage when being removed from the circuit board after test.

OBJECTS AND SUMMARY OF THE INVENTION

An object of the present invention is to provide a storage container for a channel carrier and mounted component that is constructed and arranged so as to allow periodic testing of the component while within the container.

Another object of the invention is to obtain this storage and periodic test capability with only contact engagement between the channel carrier and storage container rather than a permanent connection like that made by soldering or welding.

The desirable objectives mentioned above, along with many others, are accomplished by the storage container described herein. The container includes a base and a cover assembled with an O-ring seal there between. The base has a series of spaced slot groups, three slots to a group, with each slot group adapted to accommodate a single channel carrier. Further, each slot has a spring conductor mounted therein. Each spring conductor has one pointed end section that engages one conductive surface of the accommodated channel carrier, a centrally located post that extends through the base; and, a second end portion that forms a tab which when depressed will raise the pointed end section to allow insertion of the channel carrier thereunder. The three slots in each group are closely spaced so that the conductor springs positioned therein can be depressed simultaneously and a channel carrier inserted under the pointed end portions of the spring members. The underside of the container base has a plurality of printed circuit paths deposited thereon, and each path is electrically connected to the post of one spring member that extends through the base. These paths are routed over to one side of the container base and patterned so as to form a male plug portion that can be inserted into a suitable test device for testing of the component mounted on the channel carrier.

DETAILED DESCRIPTION OF THE INVENTION

Figure 1:
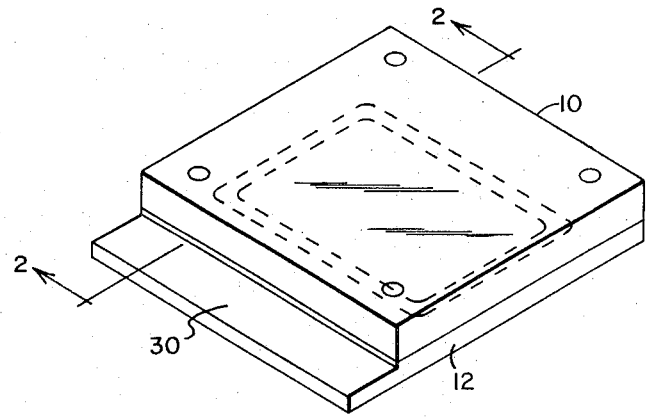
FIG. 1 is a pictorial view of the container with the cover assembled on the hose.

FIG. 1 of the drawing illustrates an assembled storage container having a cover 10 mounted on a base 12 by means of screws 14. Cover 10 has a rectangular recess 16 formed in the center thereof and a groove 18 is cut around the periphery of this recess. A seal 20 is positioned therein so that when cover 10 is assembled upon base 12 the interior of recess 16 will be sealed. The cover and base can be made of any suitable nonconducting material such as plexiglass or other suitable plastic or ceramic material.

Figure 2:
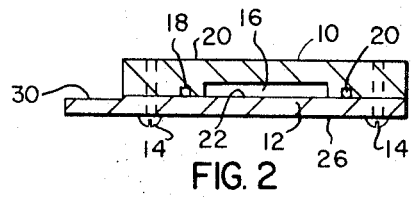
FIG. 2 is a cross-sectional view of the assembled container taken along lines 2-2 of FIG. 1.
Figure 3:
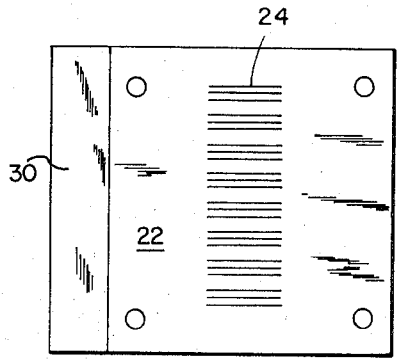
FIG. 3 is a view of the base looking at that surface which would face the cover when assembled.
Figure 4:
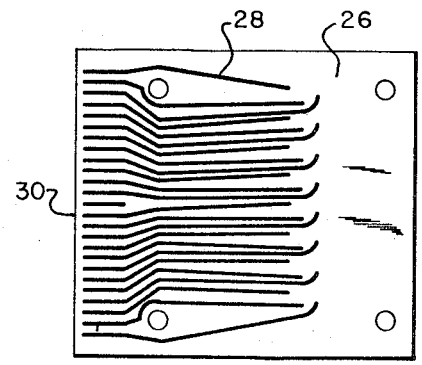
FIG. 4 is a view of the base looking at that surface thereof which would be an exterior surface when assembled.

FIG. 3 is a plan view of the base looking at surface 22 thereof which is that surface which will be facing recess 16 in the cover when the container is assembled. Eight groups of closely spaced slots 24, three slots per group, have been formed in surface 22 of the base. These slots can be formed in any desirable manner but a preferred method is by making saw cuts with a small precision saw. Surface 26 of the base has a plurality of printed circuits paths 28 formed thereon and these paths are directed over to side 30 of the base which has been reduced in thickness (see FIG. 2) so as to form a male plug portion whose purpose will be described hereafter.

Figure 5:
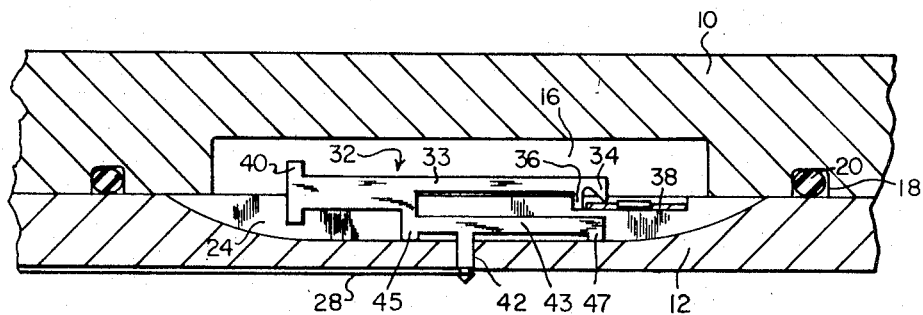
FIG. 5 is a cross-sectional view illustrating how the spring conductors are mounted in the slots cut in the base.

Referring now to FIG. 5 of the drawing wherein an enlarged view illustrates how spring conductor 32 is mounted in each of the slots 24. Spring conductor 32 is a forked member and one prong 33 of the forked end thereof terminates in a pointed portion 34 and a tab 36 closely adjacent thereto. Pointed section 34 engages a conductive surface on channel carrier 38, described in more detail hereafter, and tab 36 forms an abutment against which the channel carrier can be placed. The other end of the spring conductor is a single member that terminates in a tab portion 40 which can be manually depressed to cause upward movement of pointed portion 34. The conductor spring includes a prong 43 having tabs or legs 45 and 47 extending therefrom that rests against the bottom of the slots formed in base 12 so that when tab 40 is depressed spring 32 will bend at the fork to raise pointed portion 34. The conductor spring also includes instead a post 42 formed on prong 43 that extends through the base and connects to one of the printed circuit paths 28 formed on the base.

Figure 6:
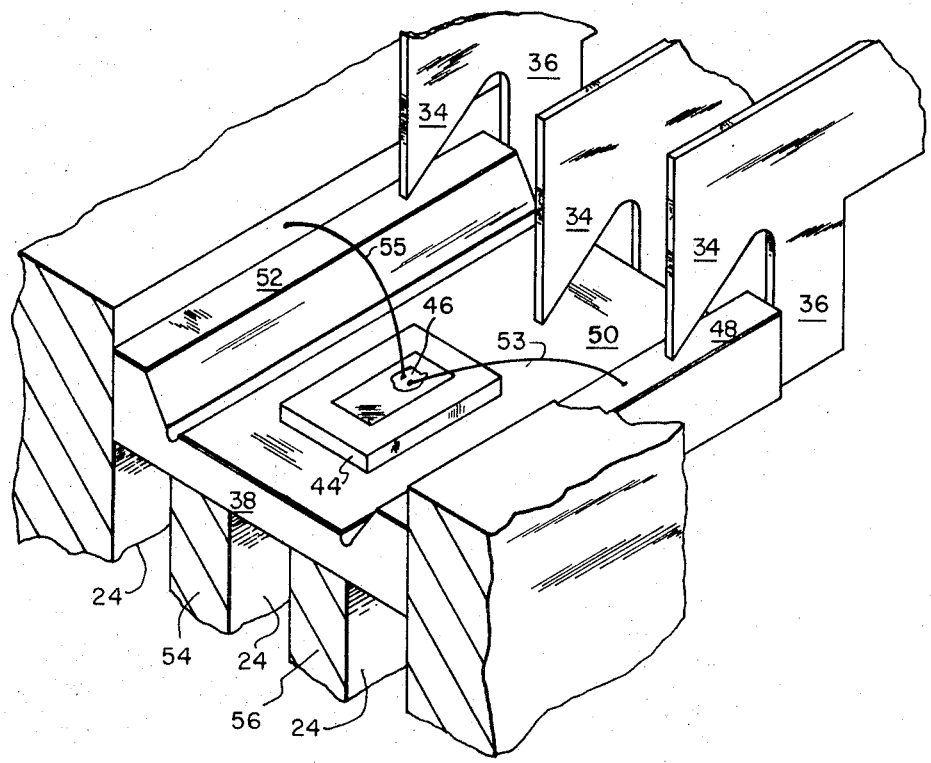
FIG. 6 is an enlarged pictorial view, broken away and in cross section of how the spring conductors engage the conductive surfaces of the channel carrier.

In order to assure that the operation and significance of the storage container is fully set forth a brief discussion of the channel carrier is believed appropriate. Channel carrier 38 is typical of many such devices that are commercially available. It is composed of a ceramic material and has a small rectangle 44 of silicon or other suitable semiconductor material sweated thereon. Material 44 in turn supports a three terminal field effect transistor 46 that has been grown or otherwise formed thereon. It will be noted that the channel carrier has three horizontal surfaces 48, 50 and 52, and each of these surfaces is coated with a conductive material. Surfaces 48 and 52 are connected to the terminals of the field effect transistor by wires 53 and 55 connected between the terminals of the field effect transistor and surfaces 58 and 52. The third terminal of the transistor is electrically connected to surface 50. As is readily apparent from FIG. 6, pointed sections 34 of the spring conductors contact the conductive surfaces of the channel carrier to form an electrical connection carried through to the outside of the container by post 40 which is connected by solder to the printed-circuit paths formed on the outside of the container. Thus it is possible to plug the loaded container into some type instrument and perform tests on the component mounted on the channel carrier. This, of course, can be accomplished without removing the channel carrier from the container or breaking the seal between the cover and base of the container.

It will be seen in FIG. 5 that the upstanding rib members 50 and 56 formed when the slots are cut into the base have been cut away to some extent so as to form a recessed area that the channel carrier will drop into when inserted under the conductor springs in a slot group. This recessed area along with the tab portions 36 formed on the spring member function as a guide and stop to assure proper alignment of the channel carrier beneath pointed section 34 of the spring conductors.

This completes the detailed description of the invention. While a preferred embodiment has been described many modifications will occur to one skilled in the art. For example, it would be a simple matter to increase the number of slots in each slot group and thereby make it possible to accommodate an electronic component with more than three input and output terminals.

I claim:
1. A storage container for a plurality of channel carriers adapted to mount an electronic component comprising:
   a base member having a plurality of solder paths formed on an exterior surface thereof;
   a cover means adapted to be mounted on said base member so as to form a sealed enclosure for the plurality of channel carriers;
   groups of closely spaced slots formed at spaced intervals in the base member so as to form a plurality of mounting positions for the channel carriers; and
   a conductor spring mounted in each of the slots for engagement with electrically conductive surfaces on the channel carriers, said conductor spring having a first two pronged end section and a second single member end section extending therefrom, one prong of said first end section being mounted in said base to support said conductor spring in its respective slot, and the other prong including a point for engaging the conductive surface of a channel carrier and an abutment tab positioned near said point that functions as a stop for a channel carrier positioned in said storage container, said conductor spring being electrically connected by solder to the solder paths formed on the exterior surface of said storage connector so that a test instrument can be connected to the electronic component mounted on said channel carrier.

2. The storage container recited in claim 1 wherein said second single member end section terminates in a tab that can be manually depressed to raise said other prong of the first end section so as to allow insertion of a channel carrier under the point on said other prong.

3. The storage container recited in claim 2 wherein said one prong includes a post member that is mounted through said base member and electrically connected to one of the solder paths to provide electrical communication between one conductive surface of the channel carrier and the exterior of said storage container.

4. The storage container recited in claim 3 wherein said solder paths formed on said base member are routed to one side of said base member to form a male plug member.

5. The storage container recited in claim 4 wherein the male plug portion is reduced in thickness relative to the remainder of the base portion.

6. The storage container recited in claim 5 wherein each group of slots comprises three slots.